United States Patent [19]

Long

[11] Patent Number: 4,482,716

[45] Date of Patent: Nov. 13, 1984

[54] DYESTUFFS AND THEIR USE IN PHOTOGRAPHIC MATERIAL

[75] Inventor: William E. Long, Brentwood, England

[73] Assignee: Ciba-Geigy AG, Basel, Switzerland

[21] Appl. No.: 487,352

[22] Filed: Apr. 22, 1983

[51] Int. Cl.³ ................. C07D 401/00; C07D 211/00; C07D 295/00

[52] U.S. Cl. ................. 546/211; 546/184; 546/279; 546/348

[58] Field of Search ................. 546/211, 279, 184, 348

[56] References Cited

U.S. PATENT DOCUMENTS

| | | | |
|---|---|---|---|
| 2,506,654 | 5/1980 | Stein | 546/211 |
| 3,686,171 | 8/1972 | Swett et al. | 546/211 |
| 4,021,428 | 5/1977 | Farutachi et al. | 546/211 |

FOREIGN PATENT DOCUMENTS

| | | | |
|---|---|---|---|
| 1091366 | 11/1967 | United Kingdom | 548/327 |
| 1292454 | 11/1972 | United Kingdom | 546/184 |
| 2014598 | 8/1979 | United Kingdom | 546/211 |

*Primary Examiner*—Paul F. Shaver
*Attorney, Agent, or Firm*—Joseph G. Kolodny

[57] ABSTRACT

The new compounds of the general formula

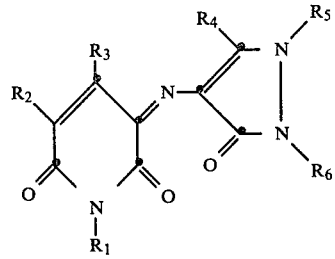

where $R_1$ is hydrogen, alkyl or cyclic alkyl, $R_2$ and $R_3$ are each hydrogen, alkyl, a carboxylic acid, ester or amide group or cyano, and $R_4$, $R_5$ and $R_6$ are each alkyl or aryl, are useful as antihalation dyes and as image dyes in photographic materials for dye-bleaching processes.

4 Claims, No Drawings

DYESTUFFS AND THEIR USE IN PHOTOGRAPHIC MATERIAL

This application is a continuation of application Ser. No. 236,488, filed 2/23/81.

This invention relates to novel dyestuffs and to their use in photographic materials.

According to the present invention there is provided a dyestuff of the formula

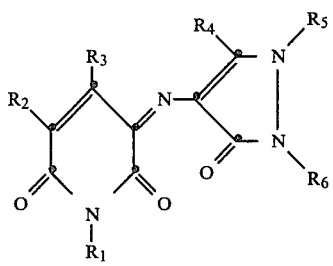
(1)

where $R_1$ is hydrogen, optionally substituted alkyl or cyclic alkyl, $R_2$ and $R_3$ are each hydrogen, optionally substituted alkyl, a carboxylic acid, ester or amide group, or cyano, and $R_4$, $R_5$ and $R_6$ are each optionally substituted alkyl or optionally substituted aryl.

$R_1$ is alkyl having from 1 to 12 carbon atoms. The alkyl radicals can be straight or branched. Examples are methyl, ethyl, propyl, butyl, pentyl, hexyl, heptyl, octyl, nonyl, decyl, undecyl and dodecyl, further isomers of these radicals such as i-propyl, i-butyl, t-butyl, i-pentyl or i-octyl. These radicals can be substituted by halogen, such as chlorine or bromine, hydroxyl, methoxy, ethoxy, propoxy, butoxy, or a carboxylic acid (—COOH) group. Preferred substituents are hydroxyl and the carboxylic acid group. Most preferably, $R_1$ is ethyl, hydroxyethyl, propyl, butyl or t-butyl. Further, $R_1$ is cyclic alkyl. These cyclic radicals can have 5 or 6 ring members. Preferred are cyclopentyl and cyclohexyl.

$R_2$ and $R_3$ are each hydrogen or alkyl. The alkyl groups can have 1 to 8 carbon atoms, e.g. methyl, ethyl, propyl, butyl, pentyl, hexyl, heptyl, octyl or isomers thereof which radicals are optionally substituted by hydroxyl, a carboxylic acid group, cyano or nitro. Further, $R_2$ and $R_3$ are cyano, a carboxylic acid, a carboxylic amide (—CONH$_2$) or a carboxylic ester group having 2 to 5 carbon atoms, preferably 3 or 5. $R_2$ and $R_3$ are preferably hydrogen, methyl, cyano or a carboxylic acid or a carboxylic amide group. Cyano is the most suitable group. $R_2$ and $R_3$ can have the same or a different meaning.

$R_4$, $R_5$ and $R_6$ are each alkyl. These alkyl groups can have 1 to 6 carbon atoms e.g. methyl, ethyl, propyl, butyl, pentyl or hexyl or isomers thereof, and are optionally substituted with halogen, such as chlorine or bromine, hydroxyl, alkoxy having 1 to 4 carbon atoms such as methoxy, or ethoxy or butoxy, or a carboxylic acid group. Preferably, the alkyl group are unsubstituted. Suitable alkyl radicals have 1 to 4 carbon atoms. Methyl is most preferred. $R_4$, $R_5$ and $R_6$ are further each aryl, e.g. phenyl or naphthyl, optionally substituted by halogen, such as chlorine or bromine, hydroxyl, cyano, nitro or a carboxylic acid group. Preferably, $R_4$, $R_5$ and $R_6$ are phenyl, optionally substituted with chlorine, hydroxyl or cyano. Phenyl is the most suitable radical for $R_4$, $R_5$ and $R_6$. $R_4$, $R_5$ and $R_6$ can have the same or a different measuring.

In suitable compounds of formula (1), $R_3$, $R_4$ and $R_5$ are all methyl and $R_6$ is phenyl.

The dyes of formula (1) are mauve or purple in colour. The actual colour is largely controlled by the nature of the group $R_2$. In particular, when $R_2$ is cyano the dyes are of bluish-purple shades, and when $R_2$ is a carboxamide group or hydrogen, the dyes are reddishpurple shades.

The dyes of formula (1) may be prepared by reaction of a hydroxy-pyridone of formula

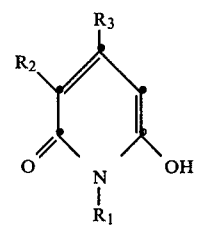
(2)

where $R_1$, $R_2$ and $R_3$ have the meanings assigned above, with a nitroso compound of formula

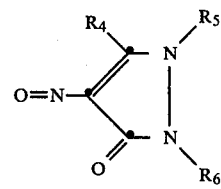
(3)

where $R_4$, $R_5$ and $R_6$ have the meanings assigned above.

Alternatively, and this is preferable, an amino compound of formula

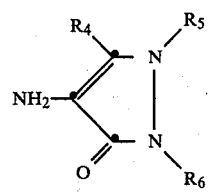
(4)

where $R_4$, $R_5$ and $R_6$ have the meanings assigned above, may be oxidised in the presence of a hydroxypyridone of formula (2). This oxidation may be carried out in an aqueous alkaline solution at temperatures of below 30° C. down to the freezing point. Suitable oxidising agents include sodium or ammonium persulphate or potassium ferricyanide.

It is to be understood that the compounds of formula (1) when $R_1$ is hydrogen may exist in different tautomeric forms, and that the compounds of formula (2) may also undergo tautomerisation.

The dyes of formula (1) are useful in photographic processes and in particular they are useful as antihalation dyes and as image dyes in photographic materials for dye-bleaching processes, e.g. in bleach-development processes. Preferably in this photographic use the dyes are coated as a solid dispersion in a gelatin or other suitable binder, the dispersions being produced by precipitation from an organic solvent, or by grinding techniques. Such grinding produces advantageous broadening or shifting of the visible absorption spectrum.

The dyes are of use in photographic processes because they are bleached by developing compositions, for example hydroquinone, especially in the presence of sulphite. Therefore these dyes are of use as bleachable underlayer, filter or backing dyes in photographic assemblies. However, the dyes are especially useful in photographic processes where the bleaching of the dye is achieved by the counterimagewise diffusion of developing agent which occurs when a silver halide latent image is being developed. Under these conditions, the dye is bleached where there is no silver image, leaving the residual dye to reinforce the silver image, giving useful reductions in the silver coating weight of photographic products. Example 2 below describes this usage.

Dyes of particular interest are for example:

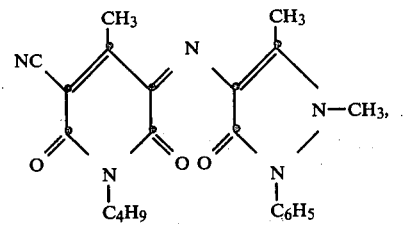
(5)

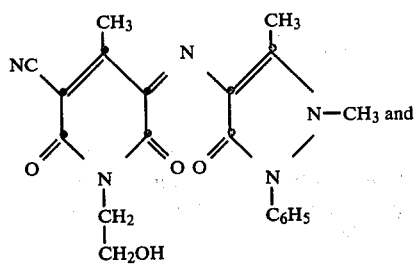
(6)

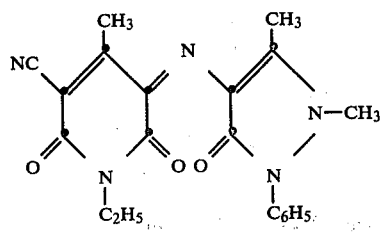
(7)

EXAMPLE 1

Synthesis of the dyes:

Method A

Compound of formula (5)

10.31 g of 1-butyl-3-cyano-6-hydroxy-4-methyl-pyrid-2-one and 2 g of sodium hydroxide in 75 ml of water are mixed with 10 g of 4-amino-antipyrine in 250 ml of water. The solution is cooled, and oxidised with 66 g of potassium ferricyanide and 7,8 g of sodium carbonate in 200 ml of water during 10 minutes with efficient stirring. After 10 minutes the mauve precipitate is filtered off and then suspended in 300 ml of water, filtered again and washed with water till the washings give no Prussian blue colour with ferric chloride. Yield: 19.8 g (98%), m.p.: 185°–186° C., λ max (ethanol): 545 nm.

Method B

Compound of formula (6)

0.97 g of 3-Cyano-6-hydroxy-1-(2-hydroxyethyl)-4-methyl-pyrid-2-one, 1 g of 4-aminoantipyrine and 0,2 g of sodium hydroxide are cooled to 5° C. in 10 ml of water. The solution is oxidised with 4,6 g of ammonium persulphate and 0,78 g of sodium carbonate in 20 ml of water over about 20 minutes. After warming to room temperature, the mauve precipitate is filtered off and washed well with water. Yield: 1.68 g, m.p.L 201°–202° C., λ max (ethanol): 548 nm.

The dyes of the following Table are synthesised by the same methods. $R_4$ and $R_5$ denote methyl and $R_6$ is phenyl, in all examples.

TABLE

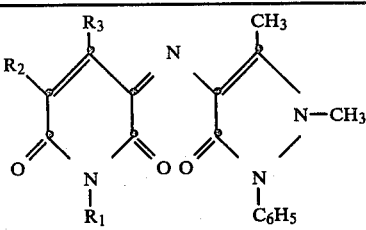

| Compound | $R_1$ | $R_2$ | $R_3$ | Method | m.p. (°C.) | λmax (ethanol) |
|---|---|---|---|---|---|---|
| (7) | $C_2H_5$ | CN | $CH_3$ | A | 194–197 | 548 nm |
| (8) | $C_6H_{11}$ | CN | $CH_3$ | B | 126–130 | 534 nm |
| (9) | H | CN | $CH_3$ | A | >290 | 550 nm |
| (10) | $C_6H_{13}$ | CN | $CH_3$ | B | 168–171 | 548 nm |
| (11) | $C_2H_5$ | $CONH_2$ | $CH_3$ | A | 178–183 | 512 nm |
| (12) | $C_2H_5$ | H | $CH_3$ | A | 150 (d) | 520 nm |
| (13) | $C_5H_{11}$ | CN | $CH_3$ | A | 165–169 | 512 nm |
| (14) | H | H | COOH | B | >300 | 512 nm |

EXAMPLE 2

A sample of photographic material is prepared which comprises as a support a 0.1 mm thick uncoloured transparent cellulose triacetate film strip. There is coated on this support in order a gelatin layer containing 2.0 g/m² of the dye of formula (5) in gelatin having a coating weight of 4 g/m², then a photosensitive silver halide emulsion layer containing silver iodobromide (Br⁻98.4%, I⁻1.6%), silver coating weight 10 mg/m² and finally a supercoat layer containing 1.0 g/m² of gelatin.

Three strips (strip A, B and C) of this sample of photographic material imagewise exposed and then processed for 1 minute in a silver halide developing solution of the following composition:

| | |
|---|---|
| hydroquinone | 50 g/liter |
| 1-phenyl-3-pyrazolidinone | 2.5 g/liter |
| sodium carbonate | 30 g/liter |
| sodium bicarbonate | 5 g/liter |
| sodium sulphite | 10 g/liter |
| water to | 1 liter |
| pH about 10 | |

In strip A the unexposed silver halide is removed by fixing for 1 minute in a 20% ammonium thiosulphate solution and the silver image is bleached by treatment in a 5% solution of cupric bromide for 5 minutes. A clear dark purple dye image is obtained.

In strip B the unexposed silver halide is removed by fixing for 1 minute in a 20% ammonium thiosulphate solution. A dark silver and dye reinforced image is obtained in this strip.

In strip C the silver development process is prolonged by a further two minutes and the unexposed silver halide removed by fixing for 1 minute in a 20% ammonium thiosulphate solution. In this case all the dye in the dye layer is bleached by the processing solution because after full development of the latent image the developing agent does not become exhausted in the silver image areas and is able to diffuse down to the underlying dye layer.

These tests show that the dyes of formula (1) may be used in photographic material to obtain a dye image only for a bleach-developing process (strip A), to obtain a dyereinforced silver image (strip B) in a bleach-development process and as an overall bleachable dye for example as an anti-halation underlayer (strip C).

I claim:

1. A dyestuff of the formula

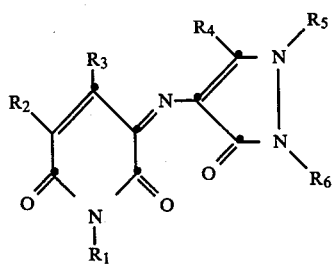

where $R_1$ is hydrogen, alkyl having 2 to 10 carbon atoms which is unsubstituted or substituted by chlorine, bromine, hydroxyl, alkoxy having 1 to 4 carbon atoms or a carboxylic acid (—COOH) group, or $R_1$ is cyclopentyl or cyclohexyl, $R_2$ and $R_3$ are each hydrogen, alkyl having 1 to 8 carbon atoms which is unsubstituted or substituted by hydroxyl, a carboxylic acid (—COOH) group, cyano or nitro, or $R_2$ and $R_3$ are each a carboxylic acid (—COOH) group, a carboxylic ester group having 2 to 5 carbon atoms, a carboxylic amide (—CONH$_2$) group or cyano, and $R_4$, $R_5$ and $R_6$ are each alkyl having 1 to 6 carbon atoms which is unsubstituted or substituted by chlorine, bromine, hydroxyl, alkoxy having 1 to 4 carbon atoms or a carboxylic acid (—COOH) group, or $R_4$, $R_5$ and $R_6$ are each phenyl which is unsubstituted or substituted by chlorine, bromine, hydroxyl, cyano, nitro or a carboxylic acid (—COOH) group.

2. A dyestuff according to claim 1 where $R_1$ is alkyl having 2, 3 or 4 carbon atoms optionally substituted by hydroxyl or a carboxylic acid (—COOH) group, cyclopentyl or cyclohexyl.

3. A dyestuff according to claim 1 where $R_2$ and $R_3$ are each hydrogen, alkyl having 1 to 4 carbon atoms, optionally substituted by hydroxyl, a carboxylic acid (—COOH) group, cyano or nitro; cyano, a carboxylic acid (—COOH), a carboxylic (—CONH$_2$) amide or a carboxylic ester group having 2 to 5 carbon atoms.

4. A dyestuff according to claim 1 where $R_4$, $R_5$ and $R_6$ are each alkyl having 1 to 4 carbon atoms, optionally substituted by halogen, hydroxyl, alkoxy having 1 to 4 carbon atoms, or a carboxylic acid (—COOH) group; or phenyl, optionally substituted by halogen, hydroxyl, cyano, nitro or a carboxylic acid (—COOH) group.

* * * * *

UNITED STATES PATENT AND TRADEMARK OFFICE
CERTIFICATE OF CORRECTION

PATENT NO. : 4,482,716

DATED : November 13, 1984

INVENTOR(S) : William E. Long

It is certified that error appears in the above-identified patent and that said Letters Patent is hereby corrected as shown below:

Title page, under No. "[73]"  Insert:

--Related U.S. Application Data

[62] Continuation of Ser. No. 236,488, Feb. 23, 1981, Abandoned

[30] Foreign Application Priority Data

Feb. 28, 1980  Great Britain  8006849--

Title page, under "U.S. Patent"  Delete "Farutachi et al." and substitute --Furutachi et al--

Signed and Sealed this

Seventeenth Day of December 1985

[SEAL]

Attest:

DONALD J. QUIGG

Attesting Officer

Commissioner of Patents and Trademarks